United States Patent Office 3,262,373
Patented July 26, 1966

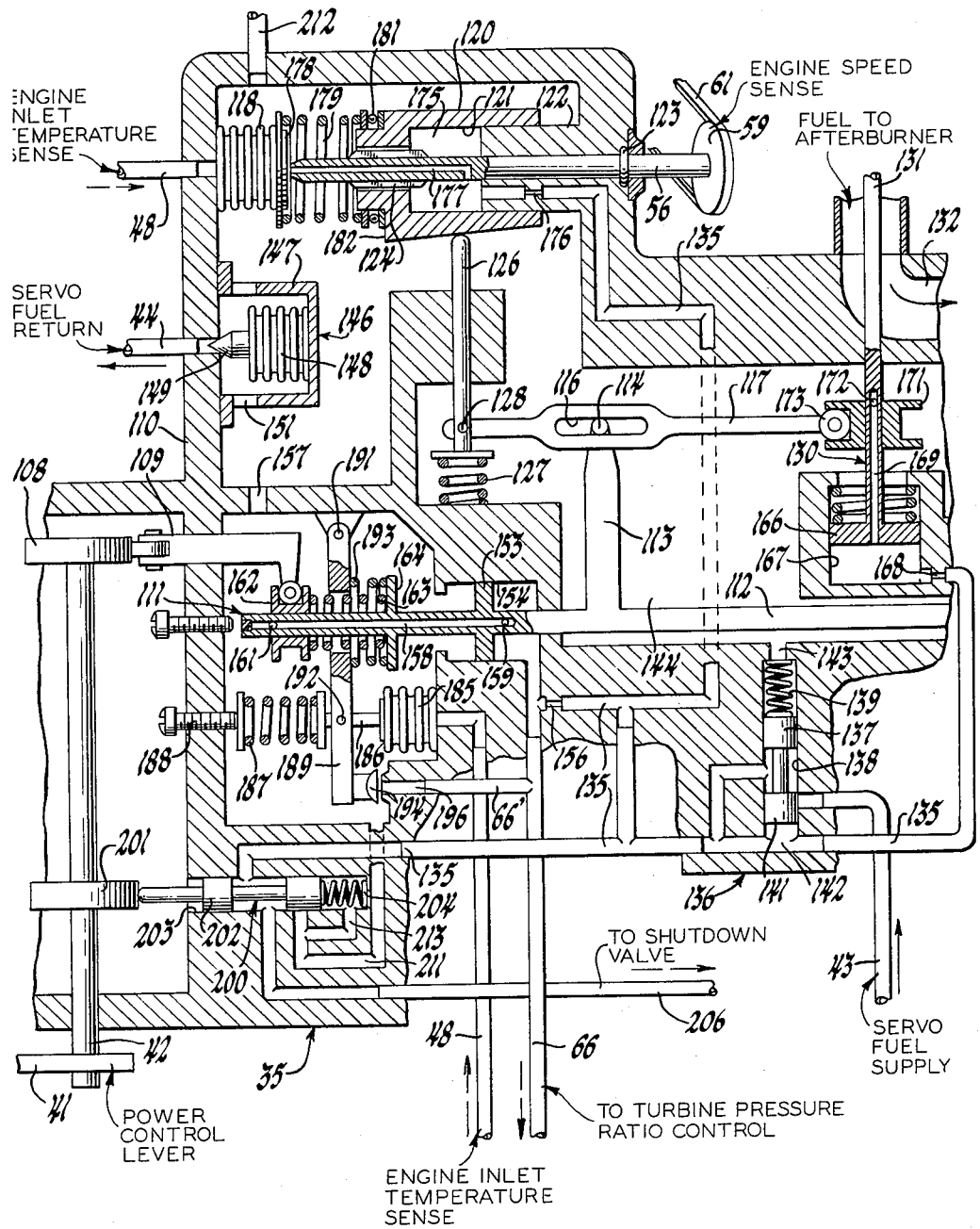

3,262,373
FUEL CONTROL SERVO SYSTEM
Harry C. Zeisloft, Flint, Mich., assignor to General Motors Corporation, Detroit, Mich., a corporation of Delaware
Application Dec. 14, 1962, Ser. No. 246,651, now Patent No. 3,174,281, dated Mar. 23, 1965, which is a continuation of application Ser. No. 847,407, Oct. 19, 1959. Divided and this application Dec. 28, 1964, Ser. No. 421,428
4 Claims. (Cl. 91—468)

This application is a division of application Serial No. 246,651, filed December 14, 1962, now Patent No. 3,174,281, which is a continuation of application Serial No. 847,407, filed October 19, 1959 (now abandoned).

My invention relates to fuel controls and is disclosed herein as embodied in a fuel control for an afterburner employed with a turbojet engine.

The abovementioned Patent No. 3,174,281 claims an afterburner fuel control and discloses such a control fully, including the relation of the control to the turbojet engine and to the main fuel system of the engine. The afterburner control incorporates means whereby the afterburner fuel is maintained in a controllable ratio to the fuel supplied to the main combustion chambers of the turbojet engine. In this way, the fuel flow to the main combustion chambers, which responds to certain parameters indicative of air flow, aids in controlling properly the amount of fuel supplied to the afterburner.

The details of the control system as such are not essential to an understanding of the invention to which this application is directed, and the details are available in Patent No. 3,174,281, which may be referred to if desired to supplement the disclosure of the present application.

The present application is directed to a system for supplying servo fuel under controlled pressure to operate servomechanisms in the fuel control and for maintaining a controlled pressure in the fuel control case into which the servomechanisms exhaust. This has a twofold beneficial result. First, the servomechanisms operate on a constant pressure drop and therefore are more consistent and accurate in their operation. Second, since the local pressure in the case is held constant, pressure-actuated devices such as temperature and pressure-responsive bellows may be mounted in the case and exposed to the pressure in the case without having variations in this pressure give spurious outputs from the bellows or other pressure responsive devices.

This application contains a disclosure of the parts of the control including the case, servomechanisms in the case, and means for controlling the supply and exhaust pressures of servo fuel, along with a description of other elements of the afterburner fuel control intimately associated therewith. This is sufficient for an understanding of the invention claimed herein but, if desired, reference may be made to Patent No. 3,174,281, the disclosure of which is incorporated by reference into this application.

The nature of the present invention will be more fully apparent from the succeeding detailed description and the accompanying drawing, which is a schematic diagram of a portion of an afterburner fuel control.

As described in the parent applications, the afterburner fuel controlling mechanism generally indicated as 35 is embodied in a system in which fuel is supplied from a suitable aircraft source to a main fuel pump and from the main fuel pump through a main fuel control to the main combustion chambers of a turbojet engine. Fuel from the same source is supplied through an afterburner fuel pump and an afterburner fuel control to the afterburner of the engine. The afterburner control embodies means for regulating the fuel supplied to the afterburner, which fuel may be modulated by a manually operated pilot's control. The fuel control 35 embodies certain servomechanisms which are actuated by fuel under pressure delivered by the main fuel pump. The engine, fuel pumps, and main fuel control are not illustrated in the drawing of this application. The settable pilot's power control lever 41 is coupled to the fuel control 35 through appropriate means such as a shaft 42. The fuel under pressure to operate servomechanisms in the control is supplied from the main fuel pump (not illustrated) through a line 43. Used servo fuel is returned to the fuel pump inlet (aircraft fuel line pressure) through an outlet 44 from control 35. The afterburner control 35 is coupled to various mechanisms responsive to the operation of the turbojet engine to control the afterburner fuel. A pressure indicative of engine inlet air temperature, which may be signified as T1, is supplied to the afterburner control through a pressure line 48 by means not illustrated.

An engine speed sense is supplied to the afterburner fuel control by means (not illustrated) driven by the turbine of the engine such, for example, as a speed servo of the type described in U.S. Patent No. 2,824,426. The speed measuring device is mechanically coupled to a speed input shaft 56 of the fuel control by any suitable means, which may be a belt and pulley type of transmission including a wheel 59 on shaft 56 having a suitable non-slip cable or belt 61 coupling the fuel control to the speed responsive device. As part of the afterburner control, a line 66 runs from the afterburner control to a turbine pressure ratio control (not illustrated) which responds to the pressure ratio across the turbine of the turbojet engine. The pressure ratio control acts by bleeding servo fuel from line 66 when the turbine pressure ratio decreases below a desired value.

The amount of fuel flowing to the afterburner is controlled primarily by mechanism (not illustrated) responsive to main fuel flow, by the pilot's lever 41, by engine inlet temperature, and by engine speed. There are also fuel limiting overrides.

Referring to the drawing, the pilot's control 41 rotates a shaft 42 on which is mounted a fuel ratio cam 108 which coacts with a follower 109 reciprocable in the body 110 of the control device. The follower 109, acting through a servomotor 111 to be described, reciprocates a slider 112 guided in the body 110. An arm 113 rigid with slider 112 mounts a pin 114 which slides in a slot 116 in a floating lever 117. Lever 117 is part of a multiplying linkage which combines the movement of slider 112 in response to the pilot's input and the action of a control device responsive to engine inlet temperature and speed.

As shown in the upper part of the figure, line 48 which conducts the pressure indicative of engine inlet temperature is connected to a bellows 118 fixed to the interior of body 110. Bellows 118 controls the axial displacement of a three-dimensional cam 120 through a force balance type servo to be described. Cam 120 has a cylindrical internal bore 121 which fits over a cylindrical boss 122 projecting from the case, thereby mounting the cam for rotation and axial movement. Cam 120 is rotated by the speed input shaft 56. This shaft is journaled in the case by means including a thrust collar 123 which holds the shaft fixed against axial movement. Splines 124 couple shaft 56 to cam 120 so that the cam is rotated by the shaft but may shift axially. A cam follower 126 reciprocably mounted in the body is biased against the contoured outer surface of cam 120 by a spring 127. Follower 126 is coupled by a pin 128 to one end of floating lever 117. The other end of lever 117 is coupled to a servomechanism 130, to be described, which causes rod 131 to reciprocate so as to follow the movements of the end of link 117. Rod 131 enters the afterburner fuel supply conduit 132 where it is coupled to means (not illustrated) for controlling afterburner fuel flow.

Changes in inlet temperature, reciprocating cam 120, and changes in engine speed, rotating the cam, reciprocate follower 126 and thereby rod 131. The pilot's input 41, by shifting the pivot pin 114, changes the ratio of transmission between follower 126 and rod 131, and therefore, link 117 acts to multiply the movements of follower 126 and slider 112. Cam 120 is contoured to set a schedule of fuel flow with respect to inlet temperature and engine speed suitable to the particular engine to which the controls apply. This cam determines a basic relation between these two controlling parameters and the ratio of afterburner to main fuel flow which ratio may be proportionally increased or decreased by movement of lever 41 shifting pivot 114.

We may now proceed to a description of the servo-mechanisms previously mentioned, beginning with the means for supplying operating fluid to them. Servo fluid for the servos illustrated is supplied from the main fuel pump through line 43. This line delivers fuel to a number of interconnected servo fuel supply lines or passages 135 through a servo fuel pressure control valve 136, which is a pressure regulating valve of known type. Valve 136 comprises a spool 137 mounted in a bore 138 of the housing 110 and biased downwardly as illustrated by compression spring 139. Servo fuel line 43 enters bore 138 through a port which is closed by land 141 of the valve spool on upward movement thereof against the spring force. Servo supply line 135 branches from bore 138 between the lands of spool 137 and communicates with a chamber 142 below the spool. The chamber above the spool communicates through a port 143 with the interior cavity, generally indicated as 144, of the housing which is filled with fuel at servo exhaust or reference pressure. Valve spool 137 moves to maintain a predetermined difference between the pressure in line 135 and that in cavity 144, dtermined by the tension of spring 139. The opening of the valve is dependent upon the demand for servo fuel and leakage from the servos.

The reference pressure in cavity 144 is maintained at a constant value slightly above the maximum value of aircraft fuel supply pressure. This result is obtained by a reference pressure regulating valve 146 which controls discharge of fuel from within the housing to the drain line 44 which connects to the fuel supply line. Valve 146 comprises a cup 147 fixed to the interior of casing 110 which has mounted within it a resilient evacuated bellows 148 to the head of which is fixed a valve plunger 149. Fuel may flow from chamber 144 through ports 151 in the cup 147 and, when the pressure reaches a value sufficient to compress bellows 48 against its elastic resistance, the bellows contracts sufficiently to allow servo fluid to exhaust into line 44. It will be seen, therefore, that means are provided to ensure predetermined substantially constant inlet and exhaust or reference pressures for the fuel operated servos. This is desirable to insure consistent operation of the servos and to provide a constant external pressure against pressure-responsive bellows such as 118, mentioned above, and 185, to be described.

Considering first the operation of the servo 111 which is controlled by the pilot's input lever 41 to move the slider 112: slider 112 is integral with a piston 153 reciprocable in a cylinder 154. Servo fuel is supplied from line 135 through an orifice 156 to the right-hand end of cylinder 154. The left-hand end of the cylinder drains to reference pressure through a passage 157. A drilled passage 158 in slider 112, which is plugged at its outer end, communicates through a lateral port 159 with the space to the right of the piston and through a lateral port 161 with reference pressure. The port 161 is controlled by a sleeve 162, reciprocable on slider 112, which is coupled to the cam follower 109. A compression spring 163 mounted between sleeve 162 and a flange 164 on the slider biases the slider to the right and biases the follower 109 into contact with cam 108. The pressure to the right of piston 153 is dependent upon the relative areas of orifice 156 and port 161, as throttled by sleeve 162. When the parts are in a static condition, port 161 is partly closed. If sleeve 162 moves to the left, port 161 will be further closed, and servo fuel will move piston 153 and slider 112 to the left until the discharge through port 161 equals the flow through orifice 156. If follower 109 moves to the right, further opening port 161, the leakage from the cylinder will exceed the inflow and the slider will move to the right until the port 161 is partly closed as before.

The servo 130 which moves the control rod 131 is essentially the same as that just described and, therefore, the structure will be described only briefly. This servo comprises a piston 166 reciprocable in a cylinder 167 to which servo fuel is supplied from passage 135 through an orifice 168. Discharge of fuel from the cylinder through a passage 169 in rod 131 is controlled by sleeve 171 coacting with a radial port 172. Sleeve 171 is coupled by a roller 173 to the end of floating lever 117.

The servo which shifts three-dimensional cam 120 in its axial direction operates upon the same general principle, but is a force balance type of servo. The chamber 175 defined by the internal cavity 121 of the cam is supplied with servo fuel from passage 135 through a restriction 176. A passage 177 in the shaft 56 provides an outlet from chamber 175 which is varied by relative movement of the head 178 of temperature bellows 118 with respect to the axially fixed shaft 56. A compression spring 179 and a ball thrust bearing 181 are mounted between head 178 and a shoulder 182 on the cam. Spring 179 provides a force tending to contract bellows 118 and a force biasing cam 120 to the right. The thrust bearing 181 permits free rotation of the cam. If we assume the temperature servo is balanced in a static condition, the force of spring 179 is such with respect to the pressure force within the bellows that it maintains a space between the end of shaft 56 and head 178 such that the pressure in chamber 175 balances the thrust of spring 179. If engine inlet temperature increases, bellows 118 will expand and the flow from chamber 175 will be further throttled. The pressure therein will increase, and the cam 120 will move to the left, compression spring 179 to restore head 178 substantially to its original position. The movement of cam 120 to load spring 179 so that its thrust balances the pressure in bellows 117 provides the temperature input to cam 120. Upon a decrease of inlet temperature, the reverse action to that just described occurs. It will be apparent that some leakage may occur past splines 124 and through the fit between boss 122 and the cam. Since this leakage is substantially constant, it may be compensated for by proper sizing of the orifices controlling the servo.

Considering now the overrides or limits on afterburner fuel flow, an engine inlet temperature responsive override means is supplied by a branch of the T1 indicating pressure line 48 which connects to a bellows 185 mounted in the case 110. The head of bellows 185 biases a rod 186 in opposition to a compression spring 187, the loading of which may be adjusted by a screw 188. A bleed valve arm 189 pivoted at 191 in the case is coupled by a pin 192 to the rod 186 so as to be swung about the pivot 191. Arm 189 is biased to the right by spring 187, and to the left by bellows 185 and by a compression spring 193 mounted between the flange 164 of slider 112 and arm 189.

The force exerted by bellows 185 depends upon engine inlet temperature, that exerted by spring 187 is substantially constant, and that exerted by spring 193 depends upon the position of slider 112 in response to the pilot's input 41. As the slider 112 moves to the right to decrease afterburner fuel, the force of spring 193 is decreased. Arm 189 mounts a valve member 194 which controls a port 196 connected through branch 66' of line 66 to the cylinder 154. Normally, valve 194 closes port 196. However, if inlet temperature is too high with respect to the afterburner fuel setting, bellows 196 forces valve 194 to the left to bleed servo fuel from cylinder 154 and reduce the afterburner fuel setting.

Limiting of fuel flow to the afterburner in response to turbine pressure ratio is effected by bleeding servo fuel from cylinder 154 through line 66 under control of a turbine pressure ratio control device (not illustrated). This may be effected by a valve similar to valve 194 in the turbine pressure ratio control which is opened whenever turbine pressure ratio reaches a predetermined minimum value.

The power control lever 41 also actuates a shutdown valve (not illustrated) which shuts off afterburner fuel. The shutdown valve is actuated by fuel under pressure under control of a shutdown pilot valve 200. The pilot operated control shaft 42 mounts a cam 201 which engages the stem of a valve spool 202 mounted in a bore 203 in the case and biased toward the cam by compression spring 204. In the position of valve 200 illustrated, servo fuel may flow from passage 135 between the lands of the valve spool into a pressure line 206. The pressure in line 206 acts to hold the shutdown valve in a position permitting fuel flow to the afterburner. When the control lever 41 is moved to the position to shut off afterburner fuel, cam 201 pushes spool 202 to the right, bleeding line 206 through a passage 211 leading to reference fuel pressure in the cavity 144 of the casing. As a result, the afterburner fuel is shut off. The connection 212 at the top of the drawing is a vent from the shutdown valve, and the chamber to the right of the valve spool 202 is vented through a connection 213.

It will be apparent that the mechanism described above is highly advantageous. The control of the supply and exhaust pressures of the servomechanism produces more consistent and accurate operation. Control of the exhaust pressure serving as the environmental pressure of the pressure-responsive bellows eliminates the need for evacuated environmental pressure compensating bellows.

The invention is not to be regarded as limited in any way by the detailed description herein of the preferred embodiment thereof for the purpose of explaining the invention. It will be apparent that many modifications can be made by the exercise of skill in the art within the scope of the principles of the invention.

I claim:

1. A fuel control device comprising, in combination, a closed case defining a cavity, at least one pressure-responsive device in the cavity exposed to the pressure within the cavity, means for transmitting a controlling pressure to the pressure-responsive device, at least one hydraulic servomechanism exhausting into the said cavity, the servomechanism exhaust back pressure thus being equal to the pressure in the cavity, fuel controlling means operatively connected with the pressure-responsive device and the servomechanism, means including a pressure-regulating device for supplying servo fluid at substantially constant pressure to the said servomechanism, the servomechanism providing a restricted fluid flow path from the said pressure regulating device into the cavity, means defining a vent for servo fluid from the said cavity, and valve means responsive to fluid pressure in the cavity controlling the said vent so as to maintain the fluid pressure in the cavity substantially constant at a value below said substantially constant supply pressure when the control device is in operation, the difference between the supply and cavity pressures providing the operating pressure drop across the servomechanism.

2. A fuel control device comprising, in combination, a closed case defining a cavity, at least one pressure-responsive device in the cavity exposed to the pressure within the cavity, means for transmitting a controlling pressure to the pressure-responsive device, a source of servo fluid under pressure, at least one hydraulic servomechanism supplied from said source and exhausting into the said cavity, the servomechanism exhaust back pressure thus being equal to the pressure in the cavity, the servomechanism providing a restricted fluid flow path from said source into the cavity, fuel controlling means operatively connected with the pressure-responsive device and the servomechanism, means defining a vent for servo fluid from the said cavity, and valve means responsive to fluid pressure in the cavity controlling the said vent so as to maintain the fluid pressure in the cavity substantially constant at a value below the pressure of the said source when the control device is in operation, the difference between the supply and cavity pressures providing the operating pressure drop across the servomechanism.

3. A fuel control device comprising, in combination, a closed case defining a cavity, at least one pressure-responsive device in the cavity exposed to the pressure within the cavity, means for transmitting a controlling pressure to the pressure-responsive device, at least one hydraulic servomechanism exhausting into the said cavity and providing a restricted flow path into the cavity, the servomechanism exhaust back pressure thus being equal to the pressure in the cavity, fuel controlling means operatively connected with the pressure-responsive device and the servomechanism, means including a pressure-regulating device for supplying servo fluid at substantially constant pressure to the said servomechanism, and means responsive to the pressure in the said cavity operative to maintain the said pressure in the cavity substantially constant at a value below the pressure of the servo fluid supplied by the pressure-regulating device when the control device is in operation, the difference between the supply and cavity pressures providing the operating pressure drop across the servomechanism.

4. A fuel control device comprising, in combination, a closed case defining a cavity, at least one pressure-responsive device in the cavity exposed to the pressure within the cavity, means for transmitting a controlling pressure to the pressure-responsive device, at least one hydraulic servomechanism exhausting into the said cavity and providing a restricted flow path into the cavity, the servomechanism exhaust back pressure thus being equal to the pressure in the cavity, fuel controlling means operatively connected with the pressure-responsive device and the servomechanism, means for supplying servo fluid to the said servomechanism, means responsive to the pressure of the servo fluid and to the pressure in the said cavity operative to maintain a substantially constant pressure drop across the servomechanism, the difference between the supply and cavity pressures providing the operating pressure drop across the servomechanism, and means responsive to the pressure in the said cavity operative to maintain the said pressure in the cavity substantially constant at a value below the pressure of said servo supply fluid when the control device is in operation.

References Cited by the Examiner

UNITED STATES PATENTS

| 1,964,398 | 6/1934 | Ferris | 60—52 |
| 3,019,602 | 1/1962 | Plummer | 60—39.28 |

EDGAR W. GEOGHEGAN, *Primary Examiner.*

SAMUEL LEVINE, *Examiner.*

P. T. COBRIN, *Assistant Examiner.*